(12) United States Patent
Trainin et al.

(10) Patent No.: US 9,118,385 B2
(45) Date of Patent: *Aug. 25, 2015

(54) DEVICE, SYSTEM AND METHOD OF WIRELESS COMMUNICATION OVER A BEAMFORMED COMMUNICATION LINK

(71) Applicant: Intel Corporation, Santa Clara, CA (US)

(72) Inventors: Solomon Trainin, Haifa (IL); Assaf Kasher, Haifa (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,332

(22) Filed: Sep. 6, 2013

(65) Prior Publication Data

US 2014/0011445 A1 Jan. 9, 2014

Related U.S. Application Data

(63) Continuation of application No. 12/941,108, filed on Nov. 8, 2010, now Pat. No. 8,843,076.

(60) Provisional application No. 61/361,841, filed on Jul. 6, 2010.

(51) Int. Cl.
*H04B 7/00* (2006.01)
*H04B 7/26* (2006.01)
(Continued)

(52) U.S. Cl.
CPC .............. *H04B 7/26* (2013.01); *H04B 7/0617* (2013.01); *H04L 1/0083* (2013.01);
(Continued)

(58) Field of Classification Search
CPC . H04W 76/02; H04W 76/025; H04W 76/045; H04B 7/048; H04B 7/0695; H04B 84/20
USPC ........... 455/41.2, 41.3, 63.4, 69–70, 507, 517
See application file for complete search history.

(56) References Cited

U.S. PATENT DOCUMENTS 6,198,730 B1 3/2001 Hogbarg et al.
6,625,165 B1 * 9/2003 Krishnamoorthy et al. .. 370/465
(Continued)

FOREIGN PATENT DOCUMENTS

CN 101542938 A 9/2009
CN 102396164 A 3/2012
(Continued)

OTHER PUBLICATIONS

International Search Report and Written Opinion Received for PCT Patent Application No. PCT/US2011/042417, Mailed on Feb. 17, 2012, 9 pages.
(Continued)

*Primary Examiner* — Simon Nguyen
(74) *Attorney, Agent, or Firm* — John F. Travis

(57) ABSTRACT

Some demonstrative embodiments include devices, systems and/or methods of wireless communication over a beamformed communication link. For example, a time for communicating may be requested, granted, and the communication take place between two consecutive beacons. In some embodiment, specific formats may be used to communicate the necessary information in this exchange.

26 Claims, 3 Drawing Sheets

(51) Int. Cl.
*H04W 24/00* (2009.01)
*H04B 7/06* (2006.01)
*H04L 1/00* (2006.01)
*H04L 1/18* (2006.01)
*H04L 1/20* (2006.01)
*H04W 84/18* (2009.01)
*H04W 16/28* (2009.01)
*H04W 76/02* (2009.01)
*H04W 84/20* (2009.01)
*H04L 25/03* (2006.01)

(52) U.S. Cl.
CPC ............ *H04L 1/1829* (2013.01); *H04L 1/20* (2013.01); *H04W 24/00* (2013.01); *H04L 2025/03426* (2013.01); *H04L 2025/03783* (2013.01); *H04L 2025/03815* (2013.01); *H04W 16/28* (2013.01); *H04W 76/023* (2013.01); *H04W 84/18* (2013.01); *H04W 84/20* (2013.01)

(56) References Cited

U.S. PATENT DOCUMENTS

| | | | |
|---|---|---|---|
| 7,149,238 B2 | 12/2006 | Agee et al. | |
| 7,778,607 B2 | 8/2010 | Withers et al. | |
| 2002/0065058 A1 | 5/2002 | Gatherer et al. | |
| 2003/0156570 A1 | 8/2003 | Alamouti et al. | |
| 2003/0169769 A1 | 9/2003 | Ho et al. | |
| 2003/0228857 A1 | 12/2003 | Maeki | |
| 2008/0130538 A1* | 6/2008 | Raissinia et al. | 370/310 |
| 2009/0124301 A1* | 5/2009 | Raissinia | 455/574 |
| 2009/0247176 A1 | 10/2009 | Song et al. | |
| 2010/0103885 A1 | 4/2010 | Cordeiro et al. | |
| 2010/0111215 A1* | 5/2010 | Nandagopalan et al. | 375/267 |
| 2010/0150254 A1 | 6/2010 | Hansen et al. | |
| 2010/0215027 A1* | 8/2010 | Liu et al. | 370/338 |
| 2010/0220690 A1* | 9/2010 | Majkowski et al. | 370/336 |
| 2010/0238797 A1 | 9/2010 | Guo et al. | |
| 2010/0265924 A1 | 10/2010 | Yong et al. | |
| 2010/0265925 A1 | 10/2010 | Liu et al. | |
| 2010/0271992 A1 | 10/2010 | Wentink et al. | |
| 2010/0271995 A1* | 10/2010 | Seok et al. | 370/311 |
| 2011/0069689 A1* | 3/2011 | Grandhi et al. | 370/338 |
| 2011/0122026 A1 | 5/2011 | DeLaquil et al. | |
| 2011/0149722 A1* | 6/2011 | Park | 370/216 |

FOREIGN PATENT DOCUMENTS

| | | |
|---|---|---|
| WO | 2010/027865 A2 | 3/2010 |
| WO | 2010/121155 A2 | 10/2010 |
| WO | 2012/006175 A2 | 1/2012 |
| WO | 2012/006175 A3 | 4/2012 |

OTHER PUBLICATIONS

"IEEE Standard for Information technology-Telecommunications and information exchange between systems-Local and metropolitan area networks-Specific requirements", Part 11: Wireless LAN Medium Access Control (MAC) and Physical Layer (PHY) Specifications, IEEE Computer Society, Jun. 12, 2007, 1232 pages.

WiGig (Wireless Gigabit Alliance) MAC and PHY Specification Version 1.0, Apr. 2010, pp. 1-311.

International Preiminary Report on Patentability for International Application No. PCT/US2011/042417 mailed on Jan. 17, 2013, 5 pages.

Office Action Received for China Patent Application No. 201180042974.0 mailed on Oct. 24, 2014, 12 pages of Office Action and 19 pages of English Translation.

Extended European Search Report Received for EP Patent Application No. 11804194.6, Mailed on Mar. 20, 2015, 8 pages.

* cited by examiner

DEVICE, SYSTEM AND METHOD OF WIRELESS COMMUNICATION OVER A BEAMFORMED COMMUNICATION LINK

CROSS REFERENCE

This application claims the benefit of and priority from U.S. patent application Ser. No. 12/941,108 filed Nov. 8, 2010, which in turn claims the benefit of and priority from U.S. Provisional Patent application No. 61/361,841, filed Jul. 6, 2010, the entire disclosure of which is incorporated herein by reference.

BACKGROUND

Beamforming may be used by antennas for directional and/or spatial signal transmission and/or reception.

A first wireless communication device and a second wireless communication device may establish a wireless communication beamformed link ("beamformed link"), for example, in accordance with the Wireless Gigabit Alliance (WGA) specification, and the like.

The first and/or second wireless communication devices may include, for example, a mmWave station (STA) ("mSTA") having a radio transmitter operating on a channel that is within a directional band ("DBand"). The DBand may include any suitable frequency band, e.g., having a channel starting frequency above 50 GHz, in which a STA is allowed to operate, e.g., as defined by the WGA specification.

The first wireless communication unit ("the initiator") may initiate the establishment of the beamformed link and, in response, the second wireless communication unit ("the responder") may perform a link-establishment procedure for establishing the beamformed link, e.g., as defined by the WGA specification.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
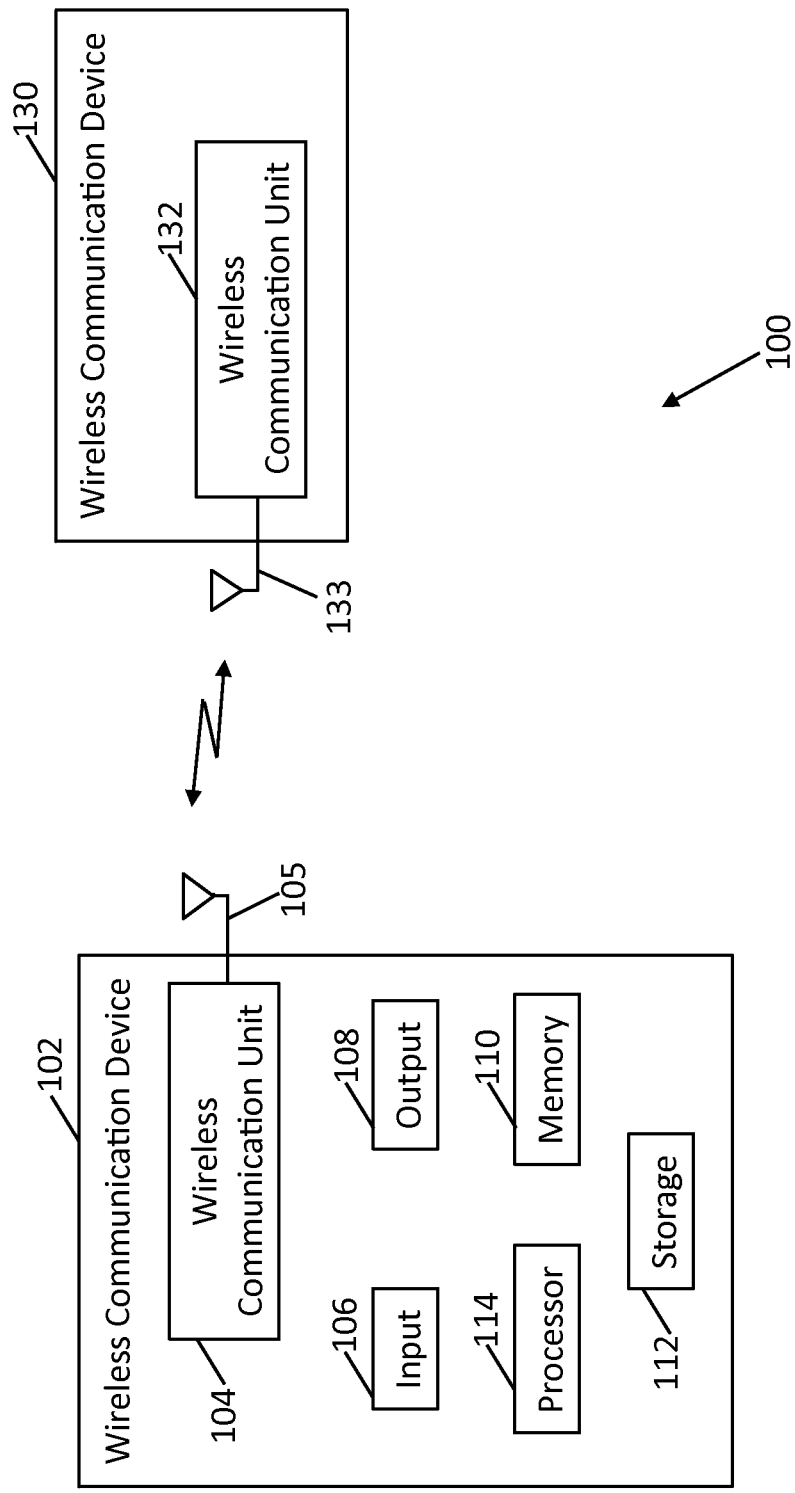
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (Wireless Gigabit Alliance, Inc *WiGig MAC and PHY Specification Version* 1.0, April 2010, Final specification) and/or future versions and/or derivatives thereof, devices and/or networks operating in accordance with existing IEEE 802.11 standards (*IEEE* 802.11-2007, *IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications; IEEE* 802.11k-2008, *IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications, Amendment* 1: *Radio Resource Measurement of Wireless LANs; IEEE* 802.11y-2008, *IEEE Standard for Information Technology—Telecommunications and information exchange between systems—Local and metropolitan area networks—Specific requirements, Part* 11: *Wireless LAN Medium Access Control (MAC) and Physical Layer (PHY)* specifications, Amendment 3: 3650-3700 MHz Operation in USA; IEEE 802.11w-2009, IEEE Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Protected Management Frames; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE P802.11vD11, Draft Standard for Information technology—Telecommunications and information exchange between systems—Local and metropolitan area networks—Specific requirements—Part 11: Wireless LAN Medium Access Control (MAC) and Physical Layer (PHY) specifications, Amendment 8: Wireless Network Management, IEEE 802.11 task group ad (TGad)) and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2 G, 2.5 G, 3 G, 3.5 G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include an antenna covered by a quasi-omni antenna pattern. For example, the antenna may include at least one of a phased array antenna, a single element antenna, a set of switched beam antennas, and the like.

The phrase "quasi-omni antenna pattern", as used herein, may include an operating mode with a widest practical beamwidth attainable for a particular antenna. The antenna gain of the main beam with the quasi-omni pattern may be at most 15 dB lower than the antenna gain in the main beam for a directional pattern.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include an antenna covered by a quasi-omni antenna pattern. For example, antennas 105 and/or 133 may include at least one of a phased array antenna, a single element antenna, a set of switched beam antennas, and the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may establish a wireless communication beamformed link ("beamformed link" or "beamformed communication link"). For example, wireless communication devices 102 and 130 may establish the beamformed link according to a suitable link-establishment method and/or procedure, e.g., according to one or more of the procedures defined by the WGA specification.

In some demonstrative embodiments, a first wireless communication unit ("the initiator") of wireless communication units 104 and 132, e.g., wireless communication unit 104, may initiate the establishment of the beamformed link, for example, while a second wireless communication unit ("the responder") of wireless communication units 104 and 132, e.g., wireless communication unit 132, may respond to the initiation by performing link-establishment operations, e.g., as defined by the WGA specification.

In some demonstrative embodiments, the beamformed link may include an uplink and/or a downlink. The downlink may include, for example, a unidirectional link from an AP to one or more non-AP stations (STAs) or a unidirectional link from a non-AP Destination STA to a non-AP Source STA, e.g., as defined by the WGA specification. The uplink may include, for example, a unidirectional link from a non-AP STA to an AP or a unidirectional link from a non-AP Source STA to a non-AP Destination STA, e.g., as defined by the WGA specification.

In some demonstrative embodiments, wireless communication units 104 and/or 132 may measure a link maintenance time period corresponding to the beamformed link, and attempt to restore the beamformed communication link upon expiration of the link maintenance time period, e.g., as described in detail below.

In some demonstrative embodiments, wireless communication units 104 and 132 may negotiate the link maintenance time period, e.g., as described in detail below.

Figure 2:
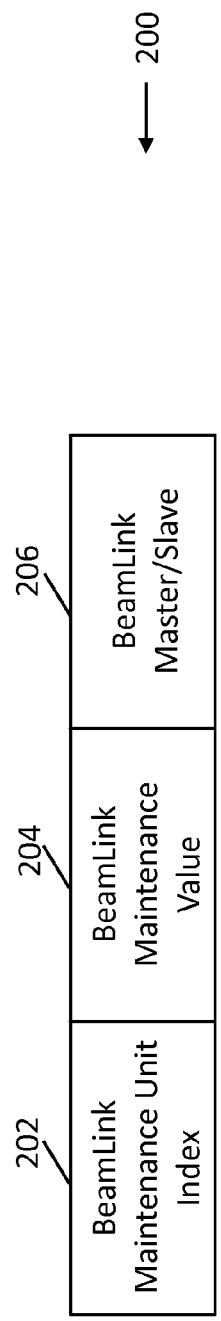
FIG. 2 is a schematic illustration of a beamformed link maintenance field, in accordance with some demonstrative embodiments.

In some demonstrative embodiments, a first wireless communication unit of wireless communication units 104 and 132, e.g., wireless communication unit 104, may transmit to a second wireless communication unit of wireless communication units 104 and 132, e.g., wireless communication unit 132, a first frame including an indication of a first negotiated maintenance time period; and/or the second wireless communication unit may transmit to the first wireless communication unit a second frame including an indication of a second negotiated maintenance time period, e.g., as described in detail below with reference to FIG. 2.

In some demonstrative embodiments, wireless communication units 104 and/or 132 may set the link maintenance time period according to one of the first and second negotiated maintenance time periods, e.g., as described in detail below.

In some demonstrative embodiments, the first frame may include a first master/slave indicator to indicate whether the first wireless communication unit requests to control the link maintenance time period; and the second frame may include a second master/slave indicator to indicate whether the second wireless communication unit requests to control the link maintenance time period, e.g., as described in detail below with reference to FIG. 2.

In some demonstrative embodiments, wireless communication units 104 and/or 132 may set the link maintenance time period based on the first and second master/slave indicators, e.g., as described in detail below.

In some demonstrative embodiments, wireless communication units 104 and/or 132 may set the link maintenance time period according to the first negotiated maintenance time period, if the first master/slave indicator indicates the first wireless communication unit requests to control the link maintenance time period and the second master/slave indicator does not indicate the second wireless communication unit requests to control the link maintenance time period, e.g., as described in detail below with reference to FIG. 2.

In some demonstrative embodiments, wireless communication units 104 and/or 132 may set the link maintenance time period based on a relationship between the first and second negotiated maintenance time periods, if both the first and second master/slave indicators indicate that both the first and second wireless communication units request to control the link maintenance time period, or if both the first and second master/slave indicators indicate that both the first and second wireless communication units do not request to control the link maintenance time period, e.g., as described in detail below with reference to FIG. 2.

In some demonstrative embodiments, at least one of the first and second frames may include a first indicator indicating a unit index selected from a plurality of predefined unit indexes, wherein the unit index represents a predefined maintenance unit value; and a second indicator indicating a maintenance value, e.g., as described below with reference to FIG. 2. The negotiated maintenance time period may be equal to a product of the maintenance unit value and the maintenance value, e.g., as described below with reference to FIG. 2.

In some demonstrative embodiments, at least one of the first and second frames may include a sector sweep feedback frame or a sector sweep acknowledgement frame, e.g., as described below.

In some demonstrative embodiments, at least one wireless communication unit of wireless communication units 104 and 132 may restart the measuring of the link maintenance time period upon receiving over the beamformed communication link at least one of a response, a service period request, a poll frame, a grant frame, a request, an acknowledgement, a denial-to-send frame, and a clear-to-send frame, e.g., as described below.

In some demonstrative embodiments, at least one wireless communication unit of wireless communication units 104 and 132 may restart the measuring of the link maintenance time period upon transmitting over the beamformed communication link at least one of an acknowledgement, a block acknowledgment, a clear-to-send frame, and a denial-to-send frame, e.g., as described below.

In some demonstrative embodiments, at least one wireless communication unit of wireless communication units 104 and 132 may transmit one or more null data frames over the beamformed link prior to expiration of the link maintenance time period, if no data units are to be transmitted by the wireless communication unit, e.g., as described below.

In some demonstrative embodiments, at least one wireless communication unit of wireless communication units 104 and 132 may halt the measuring of the link maintenance time period during at least one of a beacon time, an association beamforming training period and a contention-based period of a beacon interval, during a time when the wireless communication unit is not participating in a data transaction or during a service period not owned by the wireless communication unit, e.g., as described below.

In some demonstrative embodiments, a wireless communication unit, e.g., wireless communication unit 132, which is not an initiator of the beamformed communication link, e.g., a device which acts as the responder in the establishment of the beamformed communication link, may attempt to restore the beamformed communication link by switching antennas 133 to a quasi-omni antenna pattern.

In some demonstrative embodiments, a wireless communication unit, e.g., wireless communication unit 104, which is an initiator of the beamformed communication link, may attempt to restore the beamformed communication link by performing a transmit sector sweep (TXSS). The TXSS may include, for example, transmission of multiple Sector Sweep (SS) frames and/or millimeter wave (mmWave) beacon frames, in which a sector sweep is performed between consecutive transmissions, e.g., as defined by the WGA specification.

In some demonstrative embodiments, wireless communication devices 102 and/or 130 may perform the functionality of mmWave stations ("mSTA"), e.g., as defined by the WGA specification.

In some demonstrative embodiments, wireless communication devices 102 and/or 130 may negotiate the value of a link maintenance time period (also referred to as "the beam link maintenance time" or "the time dot11BeamLinkMaintenanceTime") corresponding to a beamformed link between the mmWave stations, e.g., as described herein.

In some demonstrative embodiments, if the beam link maintenance time has been defined, wireless communication devices 102 and/or 130 may implement a timer ("the Beam Link Maintenance Timer") to control the beamformed link. Wireless communication devices 102 and/or 130 may keep the Beam Link Maintenance Timer, for example, per each beamformed link. A range and/or resolution of the Beam Link Maintenance Timer may be of a range and/or resolution of the beam link maintenance time.

In some demonstrative embodiments, the Beam Link Maintenance Timer may be counted down. The Beam Link Maintenance Timer may be stopped, e.g., when the Beam Link Maintenance Timer reaches the value of zero, or any other predefined suitable value. In other embodiments, the Beam Link Maintenance Timer may be counted up, e.g., from zero, and/or may be stopped upon reaching any suitable predefined value, e.g., the beam link maintenance time.

In some demonstrative embodiments, the Beam Link Maintenance Timer may be halted, for example, during a Beacon Time (BT) and/or an association beamforming training (A-BFT) period of a Beacon Interval (BI). The BT may include, for example, a time interval between the start of the a mmWave Beacon transmission by a mSTA in a BI to the end of a last mmWave beacon transmission by the mSTA in the same BI, e.g., as defined by the WGA specification.

In some demonstrative embodiments, e.g., if the beamformed link is used only during Service Period (SP) allocation, then the Beam Link Maintenance Timer may be halted during SPs of other links and/or during one or more Contention Based Periods (CBPs).

In some demonstrative embodiments, the Beam Link Maintenance Timer may be set to the value of the beam link maintenance time when a source mSTA, e.g., wireless communication device 102, and a destination mSTA, e.g., wireless communication device 130, successfully complete a beamforming procedure, e.g., a beamforming procedure as defined by the WGA specification.

In some demonstrative embodiments, at least one of wireless communication devices 102 and 130 may perform the functionality of an AP mSTA and/or a personal basic service set (PBSS) control point (PCP) mSTA ("AP/PCP mSTA"). The PBSS may include a basic service set (BSS), which forms a self-contained network and includes one PBSS coordination control point (PCP), e.g., as defined by the WGA specification. Access to a distribution system (DS) may not be present in the PBSS, but an intra-PBSS forwarding service may optionally be available. Membership in a PBSS may imply that wireless communication with all other members of the PBSS is possible, e.g., as defined by the WGA specification. The PCP may include, for example, an entity that has station functionality and has received a START.confirm with a return code of SUCCESS in response to transmission of a START.request with a BSSType parameter set to "PBSS", e.g., as defined by the WGA specification.

In some demonstrative embodiments, at least one of wireless communication devices 102 and 130 may perform the functionality of a mSTA which is not an AP or PCP ("non-AP/non-PCP mSTA"), e.g., as described by the WGA specification.

In some demonstrative embodiments, the AP/PCP mSTA may set the Beam Link Maintenance Timer to the value of the beam link maintenance time when the AP/PCP mSTA receives a response from a non-AP/non-PCP mSTA during an announcement time (AT), when the AP/PCP mSTA receives a Service Period Request (SPR) frame and when the SPR frame is received with a receiving antenna directed towards the non-AP/non-PCP mSTA.

In some demonstrative embodiments, the non-AP/non-PCP mSTA may set the Beam Link Maintenance Timer to the beam link maintenance time when the non-AP/non-PCP mSTA receives a request from the AP/PCP mSTA during the AT, and when these frames are received using the beamformed link established with the AP/PCP mSTA.

In some demonstrative embodiments, a first mSTA of the beamformed link, e.g., a first device of wireless communication devices 102 and 130, may set the Beam Link Maintenance Timer to the beam link maintenance time, for example, when an immediate response or acknowledgement has been received from a second mSTA of the beamformed link, e.g., a second device of wireless communication devices 102 and 130. The immediate response or acknowledgement may include, for example, an acknowledgment (ACK), a Block Acknowledgment (BA), a mmWave Clear to Send (mmWaveCTS), or a mmWave Deny-to Send (mmWaveDTS), e.g., as are defined by the WGA specification.

In some demonstrative embodiments, a first mSTA of the beamformed link, e.g., a first device of wireless communication devices 102 and 130, may set the Beam Link Maintenance Timer to the beam link maintenance time, for example, when a transmission of the immediate response or acknowledgement has been completed to a second mSTA of the beamformed link, e.g., a second device of wireless communication devices 102 and 130.

In some demonstrative embodiments, a first mSTA of the beamformed link, e.g., a first device of wireless communication devices 102 and 130, may transmit null data frames to a second mSTA of the beamformed link, e.g., a second device of wireless communication devices 102 and 130, for example, in order to prevent expiration of the Beam Link Maintenance Timer when the first mSTA does not have data units to send over the beamformed link.

In some demonstrative embodiments, a device of devices 102 and 130 not operating as an initiator STA of the SP may configure a receive antenna to a quasi-omni antenna pattern, e.g., following the expiration of the beam link maintenance time. The receive antenna may be configured to the quasi-omni antenna pattern, for example, for a reminder of the SP and during any SP following the expiration of the beam link maintenance time.

In some demonstrative embodiments, a device of devices 102 and 130 operating as a source STA of the SP, e.g., the "initiator" of the beamforming link, may perform an initiator sector sweep (ISS), for example, after the beam link maintenance time has elapsed, e.g., to attempt and restore the beamformed link. The ISS may include, for example, an ISS as defined by the WGA specification or any other suitable SS.

In some demonstrative embodiments, a device of devices 102 and 130 operating as a responder mSTA of the beamforming link in the CBP, may configure a receive antenna to a quasi-omni antenna pattern, e.g., following the expiration of the beam link maintenance time. The receive antenna may be configured to the quasi-omni antenna pattern, for example, except when the responder mSTA is involved in another transaction.

In some demonstrative embodiments, a device of devices 102 and 130 operating as an initiator mSTA of the beamforming link in the CBP, may perform an ISS, for example, after the beam link maintenance time has elapsed, e.g., to attempt and restore the beamformed link with the responder mSTA.

In some demonstrative embodiments, a device of devices 102 and 130 operating as an mSTA may implement any suitable beam tracking and/or beam refinement procedure, e.g., to improve the link quality, e.g., upon detecting degradation in the link quality between the mSTA and another mSTA. The mSTA may request the PCP/AP mSTA to schedule a SP to perform beamforming (BF) with the other mSTA or use a CBP to perform the BF. The mSTA may use an A-BFT, e.g., as defined by the WGA specification, to perform the BF, for example, if the other mSTA is the PCP/AP of the mSTA. A PCP/AP mSTA may perform BF with a non-PCP/non-AP STA, for example, during a CBP or by scheduling an SP between the PCP/AP mSTA and the non-PCP/non-AP mSTA through an Extended Schedule element transmitted in a mmWave Beacon and/or Announce frames, e.g., as defined by the WGA specification. A PCP/AP mSTA may perform the BF during the A-BFT period, e.g., as described by the WGA specification, for example, if the link quality between the PCP/AP mSTA and a non-AP/non-PCP mSTA degrades, but the mSTA may still receive mmWave Beacon frames and a A-BFT present field is set to 1, e.g., as described by the WGA specification.

Reference is now made to FIG. 2, which schematically illustrates a Beamformed Link Maintenance field 200, in accordance with some demonstrative embodiments.

In some embodiments, field 200 may be transmitted as part of a suitable frame between first and second wireless communication devices, e.g., mSTAs, for example, wireless communication devices 102 and/or 130 (FIG. 1).

In some demonstrative embodiments, field 200 may include one or more indicators representing a maintenance time period, for example, the beam link maintenance time negotiated by a transmitter of field 200 ("the negotiated beam link maintenance time").

In some demonstrative embodiments, field 200 may include a first indicator 202 ("the BeamLink Maintenance Unit Index") and a second indicator 204 ("the BeamLink Maintenance value"), which may represent the negotiated maintenance period. In other embodiments, the negotiated maintenance period may be represented using any other suitable format and/or any one or more suitable indicators and/or values.

In some demonstrative embodiments, the BeamLink Maintenance Unit Index may be selected from a plurality of predefined unit indexes, which may represent a respective plurality of predefined maintenance unit values. The BeamLink Maintenance value may include one or more bits, for example, six bits.

In some demonstrative embodiments, the negotiated beam link maintenance time may be equal to a product of BeamLink Maintenance value and a maintenance unit value corresponding to the BeamLink Maintenance Unit Index.

In one example, the BeamLink Maintenance Unit Index may include a single bit, e.g., having a value of zero or one, representing first and second, respective, BeamLink Maintenance Unit values, e.g., in microseconds. For example, the BeamLink Maintenance Unit Index may be defined as follows:

TABLE 1

| BeamLink Maintenance Unit Index | BeamLink Maintenance Unit (us) |
|---|---|
| 0 | 32 |
| 1 | 2000 |

In some demonstrative embodiments, the value of the negotiated beam link maintenance time may be determined as follows, e.g., if the BeamLink Maintenance value is different from zero:

$$\text{beam link maintenance time} == \text{BeamLink\_Maintenance\_Unit} * \text{BeamLink\_Maintenance\_Value} \quad (1)$$

The value of the negotiated beam link maintenance time may be undefined, e.g., if the BeamLink Maintenance value is equal to zero.

In some demonstrative embodiments, field 200 may include a master/slave indicator 206, e.g., in the form of a "BeamLink Master/Slave" bit, to indicate whether the transmitter of field 200 requests to control the setting of beam link maintenance time. For example, the BeamLink Master/Slave bit 206 may be set to a first value, e.g., one, to indicate that the transmitter of field 200 requests to be the master; or set to a second value, e.g., zero, to indicate that the transmitter of field 200 is to be a slave.

In some demonstrative embodiments, the BeamLink Master/Slave bit 206 may be utilized to negotiate the beam link maintenance time, for example, based on a relationship between a first BeamLink Master/Slave value transmitted by a first mSTA (mSTA-A) and a second BeamLink Master/Slave value transmitted by a second mSTA (mSTA-B). For example, the beam link maintenance time may be set, as follows:

TABLE 2

| BeamLink Master/Slave (mSTA-A) | BeamLink Master/Slave (mSTA-B) | beam link maintenance time (mSTA-A) vs. beam link maintenance time (mSTA-B) | Result |
|---|---|---|---|
| 0 | 0 | >= | beam link maintenance time (mSTA-A) |
| 1 | 0 | Don't care | beam link maintenance time (mSTA-A) |
| 1 | 1 | = | beam link maintenance time (mSTA-A) |
| 1 | 1 | <> | Undefined |

As shown in Table 2, the beam link maintenance time may be set according to the first negotiated maintenance time period, beam link maintenance time (mSTA-A), e.g., if the first master/slave indicator, BeamLink Master/Slave (mSTA-A), indicates that the station mSTA-A requests to control the link maintenance time period and the second master/slave indicator, BeamLink Master/Slave (mSTA-B), does not indicate that the station mSTA-B requests to control the link maintenance time period.

As shown in Table 2, the beam link maintenance time may be set based on a relationship between the indicators beam link maintenance time (mSTA-A) and beam link maintenance time (mSTA-B), for example, if both the first and second master/slave indicators, BeamLink Master/Slave (mSTA-A) and BeamLink Master/Slave (mSTA-B), indicate that both the stations mSTA-A and mSTA-B request to control the link maintenance time period, e.g., if both BeamLink Master/Slave (mSTA-A) and BeamLink Master/Slave (mSTA-B) are equal to one; or that both the stations mSTA-A and mSTA-B do not request to control the link maintenance time period, e.g., if both BeamLink Master/Slave (mSTA-A) and BeamLink Master/Slave (mSTA-B) are equal to zero.

As further shown in Table 2, the beam link maintenance time may remain undefined, for example, if both the first and second master/slave indicators, BeamLink Master/Slave (mSTA-A) and BeamLink Master/Slave (mSTA-B), indicate that both the stations mSTA-A and mSTA-B request to control the link maintenance time period, e.g., if both BeamLink Master/Slave (mSTA-A) and BeamLink Master/Slave (mSTA-B) are equal to one, and the periods beam link maintenance time (mSTA-A) and beam link maintenance time (mSTA-B) have different values.

In some demonstrative embodiments, field 200 may be transmitted as part of a transmission, which may be transmitted, for example, as part of a beamforming procedure e.g., as described below with reference to FIGS. 3 and/or 4.

Figure 3:
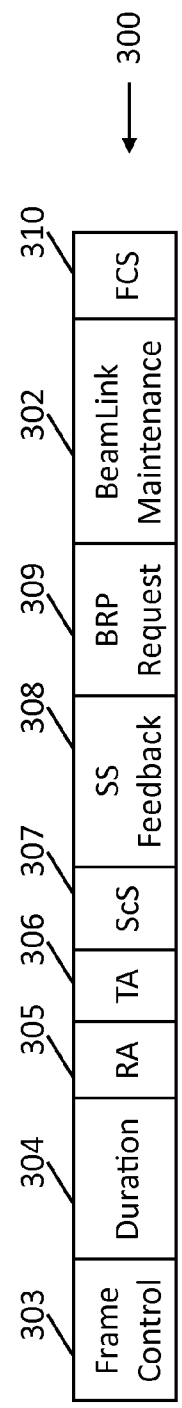
FIG. 3 is a schematic illustration of a sector-scan feedback frame, in accordance with some demonstrative embodiments.

FIG. 3 schematically illustrates a sector-scan feedback (SS-Feedback) frame 300, in accordance with some demonstrative embodiments. As shown in FIG. 3, frame 300 may include a Beamformed Link Maintenance field 302. Field 302 may include, for example, field 200 (FIG. 2). Frame 300 may also include a frame control field 303, a duration field 304, a receiver address (RA) 305, a transmitter address (TA) 306, sector sweep (ScS) field 307, a SS-Feedback field 308, a beam refinement protocol (BRP) request field 309, a frame check sequence (FCS) field 310, and/or any other suitable field, e.g., as defined by the WGA specification.

Figure 4:
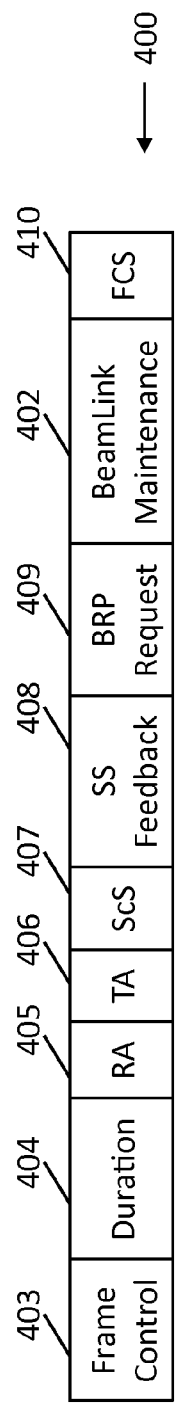
FIG. 4 is a schematic illustration of a sector-scan acknowledgement frame, in accordance with some demonstrative embodiments.

FIG. 4 schematically illustrates a sector-scan acknowledgement (SS-ACK) frame 400, in accordance with some demonstrative embodiments. As shown in FIG. 4, frame 400 may include a Beamformed Link Maintenance field 402. Field 402 may include, for example, field 200 (FIG. 2). Frame 400 may also include a frame control field 403, a duration field 404, a RA 405, a TA 406, ScS field 407, a SS-Feedback field 408, a BRP request field 409, a FCS field 410, and/or any other suitable field, e.g., as defined by the WGA specification.

Figure 5:
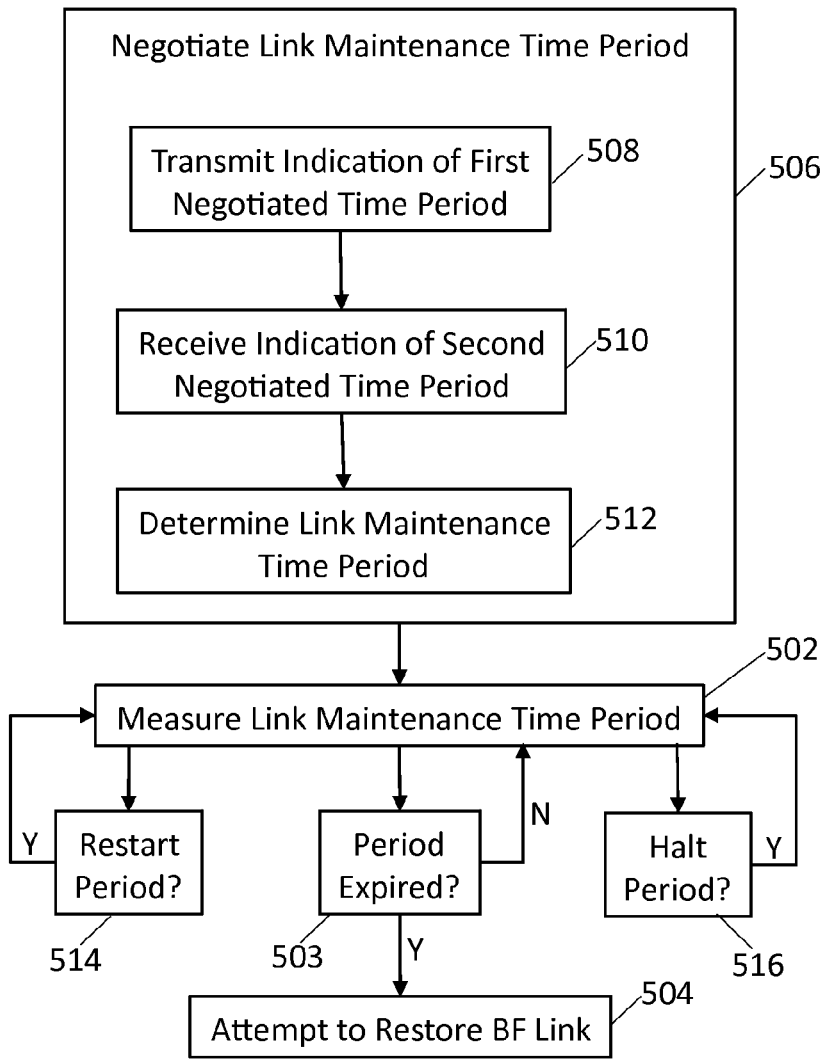
FIG. 5 is a schematic illustration of a method of wireless communication over a beamformed link, in accordance with some demonstrative embodiments.

Reference is made to FIG. 5, which schematically illustrates a method of wireless communication over a beamformed link, in accordance with some demonstrative embodiments. In some embodiments, one or more of the operations of the method of FIG. 5 may be performed by any suitable wireless communication system e.g., system 100 (FIG. 1); wireless communication device, e.g., devices 102 and/or 130 (FIG. 1); and/or wireless communication unit, e.g., wireless communication units 104 and/or 132 (FIG. 1).

As indicated at block 502, the method may include measuring a link maintenance time period corresponding to a beamformed communication link established between a first wireless communication device and a second wireless communication device. For example, wireless communication device 102 (FIG. 1) may measure a beam link maintenance time (e.g., the dot11BeamLinkMaintenanceTime), corresponding to a beamformed communication link established between wireless communication device 102 (FIG. 1) and wireless communication device 130 (FIG. 1), e.g., as described above.

As indicated at blocks 503 and 504, the method may include attempting to restore the beamformed link upon expiration of the link maintenance time period. For example, wireless communication device 102 (FIG. 1) may attempt to restore the beamformed link upon expiration of the beam link maintenance time, e.g., as described above.

As indicated at block 506, the method may include negotiating the link maintenance time period. For example, wireless communication devices 102 and 130 (FIG. 1) may negotiate the value of the beam link maintenance time, e.g., as described above.

As indicated at block 508, negotiating the link maintenance time period may include transmitting an indication of a first negotiated time period. For example, wireless communication device 102 (FIG. 1) may transmit to wireless communication device 130 (FIG. 1) a first frame including field 200 (FIG. 2), which includes the BeamLink Maintenance Unit Index 202 (FIG. 1) and the BeamLink Maintenance value 204 (FIG. 1) representing the first negotiated time period, e.g., as described above.

As indicated at block 510, negotiating the link maintenance time period may include receiving an indication of a second negotiated time period. For example, wireless communication device 102 (FIG. 1) may receive from wireless communication device 130 (FIG. 1) a second frame including field 200 (FIG. 2), which includes the BeamLink Maintenance Unit Index 202 (FIG. 1) and the BeamLink Maintenance value 204 (FIG. 1) representing the second negotiated time period, e.g., as described above.

As indicated at block 512, negotiating the link maintenance time period may include setting the link maintenance time period, e.g., based on the first and second negotiated time periods. For example, wireless communication devices 102 and/or 130 (FIG. 1) may set the beam link maintenance time based on the first and second negotiated time periods, e.g., as described above.

As indicated at block 514, the method may include restarting the link maintenance time period, e.g., based on predefined criteria. For example, wireless communication devices 102 and/or 130 (FIG. 1) may restart the beam link maintenance time upon receiving and/or transmitting one or more predefined transmissions, e.g., as described above.

As indicated at block 516, the method may include halting the link maintenance time period, e.g., based on predefined criteria. For example, wireless communication devices 102 and/or 130 (FIG. 1) may halt the beam link maintenance time during one or more predefined time periods, e.g., as described above.

Figure 6:
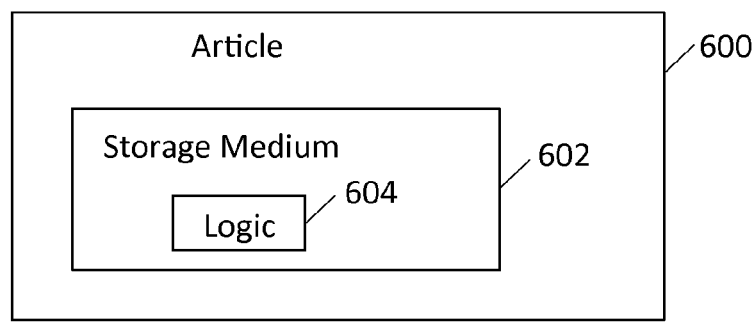
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a machine-readable storage medium 602 to store logic 604, which may be used, for example, to perform at least part of the functionality of wireless communication unit 104 (FIG. 1), wireless communication device 102 (FIG. 1), wireless communication unit 132 (FIG. 1), wireless communication device 130 (FIG. 1); and/or to perform one or more operations of the method of FIG. 5.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A first wireless communication device comprising:
a processor, a memory, and a wireless communication unit to establish a beamformed communication link with a second wireless communication device;
wherein the wireless communication unit is to transmit a field containing a first portion indicating a beamlink maintenance unit index, the first portion followed by a second portion indicating a beamlink maintenance value, the second portion followed by a third portion indicating which of the first and second wireless communication devices is to act as a master in a communication over the beamformed communication link.

2. The first wireless communication device of claim 1, wherein a beamlink maintenance time period for the beamformed communication link is to be determined by multiplying a quantity indicated by the beamlink maintenance unit index times a quantity indicated by the beamlink maintenance value.

3. The first wireless communication device of claim 1, wherein the first portion consists of one bit, the second portion consists of six bits, and the third portion consists of one bit.

4. The first wireless communication device of claim 1, wherein the field is to be used in a negotiation between the first and second wireless communication devices.

5. The first wireless communication device of claim 1, further comprising a phased-array antenna system.

6. A computer-readable non-transient storage medium containing instructions stored thereon, which if executed by a machine, cause the machine to perform operations comprising:
establishing a beamformed communication link with a wireless communication device;
transmitting a field containing a first portion indicating a beamlink maintenance unit index, the first portion followed by a second portion indicating a beamlink maintenance value, the second portion followed by a third portion indicating whether the wireless communication device is to act as a master in a communication over the beamformed communication link.

7. The medium of claim 6, wherein the operations further comprise determining a beamlink maintenance time period for the beamformed communication link by multiplying a quantity indicated by the beamlink maintenance unit index times a quantity indicated by the beamlink maintenance value.

8. The medium of claim 6, wherein the first portion consists of one bit, the second portion consists of six bits, and the third portion consists of one bit.

9. The medium of claim 6, wherein the field is to be used in a negotiation with the wireless communication device.

10. A method, comprising:
establishing, by a first wireless communication device, a beamformed communication link with a second wireless communication device;
transmitting a field containing a first portion indicating a beamlink maintenance unit index, the first portion followed by a second portion indicating a beamlink maintenance value, the second portion followed by a third portion indicating which of the first and second devices is to act as a master in a communication over the beamformed communication link.

11. The method of claim 10, wherein a beamlink maintenance time period for the beamformed communication link is to be determined by multiplying a quantity indicated by the beamlink maintenance unit index times a quantity indicated by the beamlink maintenance value.

12. The method of claim 10, wherein the first portion consists of one bit, the second portion consists of six bits, and the third portion consists of one bit.

13. The method of claim 10, wherein the field is to be used in a negotiation between the first and second wireless communication devices.

14. A first wireless communication device comprising:
a processor, a memory, and a wireless communication unit to establish a beamformed communication link with a second wireless communication device;
wherein the wireless communication unit is to receive a field containing a first portion indicating a beamlink maintenance unit index, the first portion followed by a second portion indicating a beamlink maintenance value, the second portion followed by a third portion indicating which of the first and second wireless communication devices is to act as a master in a communication over the beamformed communication link.

15. The first wireless communication device of claim 14, wherein a beamlink maintenance time period for the beamformed communication link is equal to an amount determined by multiplying a quantity indicated by the beamlink maintenance unit index times a quantity indicated by the beamlink maintenance value.

16. The first wireless communication device of claim 14, wherein the first portion consists of one bit, the second portion consists of six bits, and the third portion consists of one bit.

17. The first wireless communication device of claim 14, wherein the field is to be used in a negotiation between the first and second wireless communication devices.

18. The first wireless communication device of claim 14, further comprising a phased-array antenna system.

19. A computer-readable non-transient storage medium containing instructions stored thereon, which if executed by a machine, cause the machine to perform operations comprising:
establishing a beamformed communication link between first and second wireless communication devices;
receiving a field containing a first portion indicating a beamlink maintenance unit index, the first portion followed by a second portion indicating a beamlink maintenance value, the second portion followed by a third portion indicating which of the first and second wireless communication devices is to act as a master in a communication over the beamformed communication link.

20. The medium of claim 19, wherein a beamlink maintenance time period for the beamformed communication link is equal to an amount determined by multiplying a quantity indicated by the beamlink maintenance unit index times a quantity indicated by the beamlink maintenance value.

21. The medium of claim 19, wherein the first portion consists of one bit, the second portion consists of six bits, and the third portion consists of one bit.

22. The medium of claim 19, wherein the field is to be used in a negotiation between the first and second wireless communication devices.

23. A method, comprising:
    establishing a beamformed communication link between first and second wireless communication devices;
    receiving a field containing a first portion indicating a beamlink maintenance unit index, the first portion followed by a second portion indicating a beamlink maintenance value, the second portion followed by a third portion indicating which of the first and second wireless communication devices is to act as a master in a communication over the beamformed communication link.

24. The method of claim 23, wherein a beamlink maintenance time period for the beamformed communication link is determined by multiplying a quantity indicated by the beamlink maintenance unit index times a quantity indicated by the beamlink maintenance value.

25. The method of claim 23, wherein the first portion consists of one bit, the second portion consists of six bits, and the third portion consists of one bit.

26. The method of claim 23, wherein the field is used in a negotiation between the first and second wireless communication devices.

\* \* \* \* \*